(12) United States Patent
Xu et al.

(10) Patent No.: US 9,124,774 B2
(45) Date of Patent: Sep. 1, 2015

(54) METHODS FOR DELIVERING AND RECEIVING INTERACTIVE MULTIMEDIA

(75) Inventors: Jun Xu, Beijing (CN); Jun Li, Cranbury, NJ (US); Lin Du, Beijing (CN); Si Nan Shangguan, Beijing (CN)

(73) Assignee: THOMSON LICENSING, Boulogne-Billancourt (FR)

( * ) Notice: Subject to any disclaimer, the term of this patent is extended or adjusted under 35 U.S.C. 154(b) by 293 days.

(21) Appl. No.: 12/661,660

(22) Filed: Mar. 22, 2010

(65) Prior Publication Data

US 2010/0250655 A1 Sep. 30, 2010

(30) Foreign Application Priority Data

Mar. 24, 2009 (EP) ..................................... 09305260

(51) Int. Cl.
| | |
|---|---|
| *G06F 15/16* | (2006.01) |
| *G06F 15/173* | (2006.01) |
| *H04N 7/173* | (2011.01) |
| *H04N 21/24* | (2011.01) |
| *H04N 21/262* | (2011.01) |
| *H04N 21/4722* | (2011.01) |

(Continued)

(52) U.S. Cl.
CPC ....... *H04N 7/17336* (2013.01); *H04N 7/17327* (2013.01); *H04N 21/2408* (2013.01); *H04N 21/262* (2013.01); *H04N 21/4722* (2013.01); *H04N 21/4758* (2013.01); *H04N 21/6543* (2013.01)

(58) Field of Classification Search
CPC G06Q 50/01; H04L 12/2494; H04L 12/2602; H04L 12/5695; H04L 29/06207; H04L 29/06034; H04L 29/06047; H04L 29/06095; H04L 29/06462; H04L 29/06523; H04L 29/06537; H04L 29/0809; H04L 29/08108; H04L 29/08144; H04L 29/08171; H04L 29/08954; H04L 41/509; H04L 47/15; H04H 20/28; H04N 5/04; H04N 5/44543; H04N 5/44591; H04N 7/025; H04N 7/173; H04N 7/17318; H04N 7/17336; H04N 21/235; H04N 21/2381; H04N 21/44222; H04N 21/4438; H04N 21/4622; H04N 21/47202; H04N 21/4722; H04N 21/4782; H04Q 11/0478
USPC ........................................................ 709/203
See application file for complete search history.

(56) References Cited

U.S. PATENT DOCUMENTS

| | | | |
|---|---|---|---|
| 5,737,009 A | 4/1998 | Payton | |
| 6,272,151 B1 * | 8/2001 | Gupta et al. | .................. 370/489 |

(Continued)

FOREIGN PATENT DOCUMENTS

| | | |
|---|---|---|
| CN | 101009536 | 8/2007 |
| EP | 1081917 | 3/2001 |

(Continued)

OTHER PUBLICATIONS

European Search Report dated Aug. 13, 2009.

*Primary Examiner* — Melvin H Pollack
(74) *Attorney, Agent, or Firm* — Tutunjian & Bitetto, P.C.

(57) ABSTRACT

A method used in a service providing device for delivering interactive multimedia content to a plurality of client devices, comprising: receiving a request for the interactive multimedia content, from at least one of the plurality of client devices; disabling the plurality of client devices from sending the request to the service providing device, according to a predetermined condition; and delivering the interactive multimedia content to the plurality of client devices.

29 Claims, 6 Drawing Sheets

(51) Int. Cl.
*H04N 21/475* (2011.01)
*H04N 21/6543* (2011.01)

(56) References Cited

U.S. PATENT DOCUMENTS

| | | | |
|---|---|---|---|
| 6,785,714 B1 | 8/2004 | Thompson et al. | |
| 7,278,153 B1 * | 10/2007 | Sanders | 725/115 |
| 7,305,697 B2 * | 12/2007 | Alao et al. | 725/114 |
| 7,475,419 B1 | 1/2009 | Basu et al. | 726/2 |
| 7,478,158 B1 * | 1/2009 | Rodgers et al. | 709/226 |
| 7,546,383 B2 * | 6/2009 | Smith | 709/246 |
| 7,688,820 B2 * | 3/2010 | Forte et al. | 370/389 |
| 7,822,862 B2 * | 10/2010 | Slater et al. | 709/229 |
| 7,827,294 B2 * | 11/2010 | Merkow et al. | 709/229 |
| 7,853,711 B1 * | 12/2010 | Johnson et al. | 709/231 |
| 7,908,626 B2 * | 3/2011 | Williamson et al. | 725/90 |
| 7,921,179 B1 * | 4/2011 | Zheng et al. | 709/213 |
| 7,940,761 B2 * | 5/2011 | Umesawa et al. | 370/389 |
| 7,949,779 B2 * | 5/2011 | Farber et al. | 709/234 |
| 7,953,857 B2 * | 5/2011 | Short et al. | 709/226 |
| 8,041,780 B2 * | 10/2011 | Bhatia et al. | 709/219 |
| 8,055,754 B2 * | 11/2011 | Scheering | 709/224 |
| 8,078,733 B2 * | 12/2011 | Åstrom et al. | 709/227 |
| 8,086,692 B2 * | 12/2011 | Sridhar et al. | 709/217 |
| 8,086,732 B1 * | 12/2011 | Volz et al. | 709/225 |
| 8,166,509 B2 * | 4/2012 | Brooks et al. | 725/95 |
| 8,230,456 B2 * | 7/2012 | Jacoby et al. | 725/9 |
| 8,281,352 B2 * | 10/2012 | Brooks et al. | 725/95 |
| 8,347,338 B2 * | 1/2013 | Noblecourt et al. | 725/60 |
| 8,555,318 B2 * | 10/2013 | Whitehead | 725/46 |
| 8,584,180 B2 * | 11/2013 | Gray et al. | 725/80 |
| 8,607,289 B2 * | 12/2013 | Brown et al. | 725/110 |
| 8,661,481 B2 * | 2/2014 | Maynard et al. | 725/88 |
| 8,693,504 B2 * | 4/2014 | Jerding et al. | 370/486 |
| 2002/0108121 A1 | 8/2002 | Alao et al. | |
| 2003/0208763 A1 | 11/2003 | McElhatten et al. | |
| 2004/0210936 A1 | 10/2004 | Rao et al. | |
| 2005/0273803 A1 | 12/2005 | Takagi et al. | |
| 2007/0180112 A1 * | 8/2007 | McEnroe et al. | 709/226 |
| 2007/0220587 A1 | 9/2007 | Loyer | |
| 2009/0031345 A1 | 1/2009 | Vagnati | |
| 2009/0125961 A1 * | 5/2009 | Perlman et al. | 725/112 |
| 2009/0150548 A1 * | 6/2009 | Smith et al. | 709/226 |
| 2010/0005496 A1 * | 1/2010 | Ellis et al. | 725/87 |
| 2010/0274919 A1 * | 10/2010 | Greene et al. | 709/231 |
| 2010/0325239 A1 * | 12/2010 | Khedouri et al. | 709/217 |
| 2011/0055419 A1 * | 3/2011 | Gould et al. | 709/231 |
| 2011/0072139 A1 * | 3/2011 | Denker et al. | 709/226 |
| 2012/0137337 A1 * | 5/2012 | Sigmon et al. | 725/110 |
| 2012/0180080 A1 * | 7/2012 | Lajoie | 725/14 |
| 2012/0185899 A1 * | 7/2012 | Riedl et al. | 725/35 |
| 2013/0212635 A1 * | 8/2013 | Sedlak et al. | 725/118 |
| 2014/0059627 A1 * | 2/2014 | Gonder et al. | 725/93 |
| 2014/0109132 A1 * | 4/2014 | Hasek et al. | 725/32 |

FOREIGN PATENT DOCUMENTS

| | | |
|---|---|---|
| EP | 1874061 | 1/2008 |
| GB | 0603237 | 3/2006 |
| JP | 2005323248 | 11/2005 |

* cited by examiner

| Threshold Value | Interactive multimedia | Request count | |
|---|---|---|---|
| 5 | Background for Athlete A | 2 | T 401 |
| 5 | History for the team | 3 | T 402 |
| 10 | Score of the team | 5 | T 403 |

METHODS FOR DELIVERING AND RECEIVING INTERACTIVE MULTIMEDIA

This application claims the benefit, under 35 U.S.C. §119 of French Patent Application 09305260.3, filed Mar. 24, 2009.

FIELD OF THE INVENTION

The present invention relates in general to digital communication system, and more particularly, to methods for delivering and receiving interactive multimedia content in the digital communication system.

BACKGROUND OF THE INVENTION

Digital broadcast communication systems such as DVB-H (Digital Video Broadcasting—Handheld), DVB-T (Digital Video Broadcasting—Terrestrial) or other client-server communication system, enable end users to receive digital content including video, audio, and data. Using a fixed or mobile terminal, a user may receive digital contents over a cable or wireless digital communication network. For example, a user may receive data such as a broadcast program in a data stream. Additional data associated with the broadcast program such as interactive multimedia contents including program title, news, interactive services, or additional audio, video and graphics, may also be available. The interactive multimedia contents can be previously stored at the server or generated during the broadcasting or multicasting of the program.

Interactive multimedia content is a service that aggregates interactive services with a conventional A/V broadcasting service. MPEG-4 Part 20 designates interactive multimedia using the terms 'rich media'. OpenTV and DVB designate interactive multimedia using the terms 'interactive television'. The core idea of interactive multimedia is adding one or more interactive multimedia to an original A/V stream. The content of the interactive multimedia, usually synchronized with the original A/V stream, will enable reaction to different user inputs. The processing of user inputs can be either handled locally or remotely, in the latter case using a bi-directional channel.

The content of the interactive multimedia service is a collection of multimedia data, such as graphics, text, audio and video etc, which may change over time based on the A/V stream. The A/V stream has its own timeline, here, the timeline is a term used to describe that a video/audio sequence is ordered by time stamp. The corresponding contents of interactive multimedia content also have a timeline, which relates to this A/V stream timeline by a reference, such as a start point tag. That is, there is a temporal synchronization between the corresponding interactive multimedia content and the A/V stream. The start point tag refers the specific time point of the timeline of A/V stream. When the A/V stream plays to the specific time point, an event is triggered to play the corresponding interactive multimedia contents.

The interactive multimedia contents are shown according to users input during a specific period of timeline of A/V stream. For example, a sports TV (television) channel may be associated with a pop-up interactive multimedia content that describes an athlete who just scored a goal and the video scene of the athlete is being broadcasted. When the video scene of the program changes, the other interactive multimedia contents will be used accordingly. The transmitted interactive multimedia content can be either integrally multiplexed into conventional A/V stream or sent in a separate channel.

According to the above, interactive multimedia services can be an interactive experience during a specific period of the A/V stream between a multimedia server such as a service providing device and the end users. During the specific period users may send requests for a type of interactive multimedia to the service providing device, and then the service providing device will send the requested multimedia content to the users. However, the bandwidth resource used by interactive multimedia services for multimedia requesting and multimedia delivery during the specific period will not scale well with growing numbers of users. This may be the case for a multicasting communication environment or a broadcasting TV network with return channel.

Therefore, an improved method for requesting and delivering interactive multimedia content is needed.

SUMMARY OF THE INVENTION

The invention concerns a method used in a service providing device for delivering interactive multimedia content to a plurality of client devices during a specific period when a corresponding audio and/or video stream associated with the interactive multimedia content is being delivered, comprising: receiving a request for a given multimedia content, from at least one of the plurality of client devices; disabling the plurality of client devices from sending further requests for said given multimedia content to the service providing device, according to a predetermined condition; and delivering the multimedia content to the plurality of client devices in response to said condition.

The invention also concerns a service providing device for implementing the above mentioned method for delivering an interactive multimedia content in the multimedia communication network. The service providing device comprises a transmission processing device for receiving a request for the interactive multimedia content from at least one of the plurality of client devices; disabling the plurality of client devices from sending the request to the service providing device, according to a predetermined condition; and delivering the interactive multimedia content to the plurality of client devices, by a processor and a communication interface.

The invention also concerns a method for receiving a interactive multimedia content, used in a client device of a communication network, comprising: receiving a request for a given multimedia content to be sent to a service providing device of the communication network, from an input device of the client device; disabling sending a request message corresponding to the user request to the service providing device according to a predetermined condition; and displaying the interactive multimedia content received from the service providing device.

The invention also concerns a client device for implementing the above mentioned method for receiving interactive multimedia content in the multimedia communication network. The client device comprises a processor for receiving a request for the interactive multimedia content to be sent to a service providing device of the communication network through a user interface, disabling sending the request to the service providing device according to a predetermined condition; and displaying the interactive multimedia content received from the service providing device through a communication interface.

BRIEF DESCRIPTION OF DRAWINGS

These and other aspects, features and advantages of the present invention will become apparent from the following description of an embodiment in connection with the accompanying drawings.

DETAILED DESCRIPTION OF PREFERRED EMBODIMENTS

Figure 1:
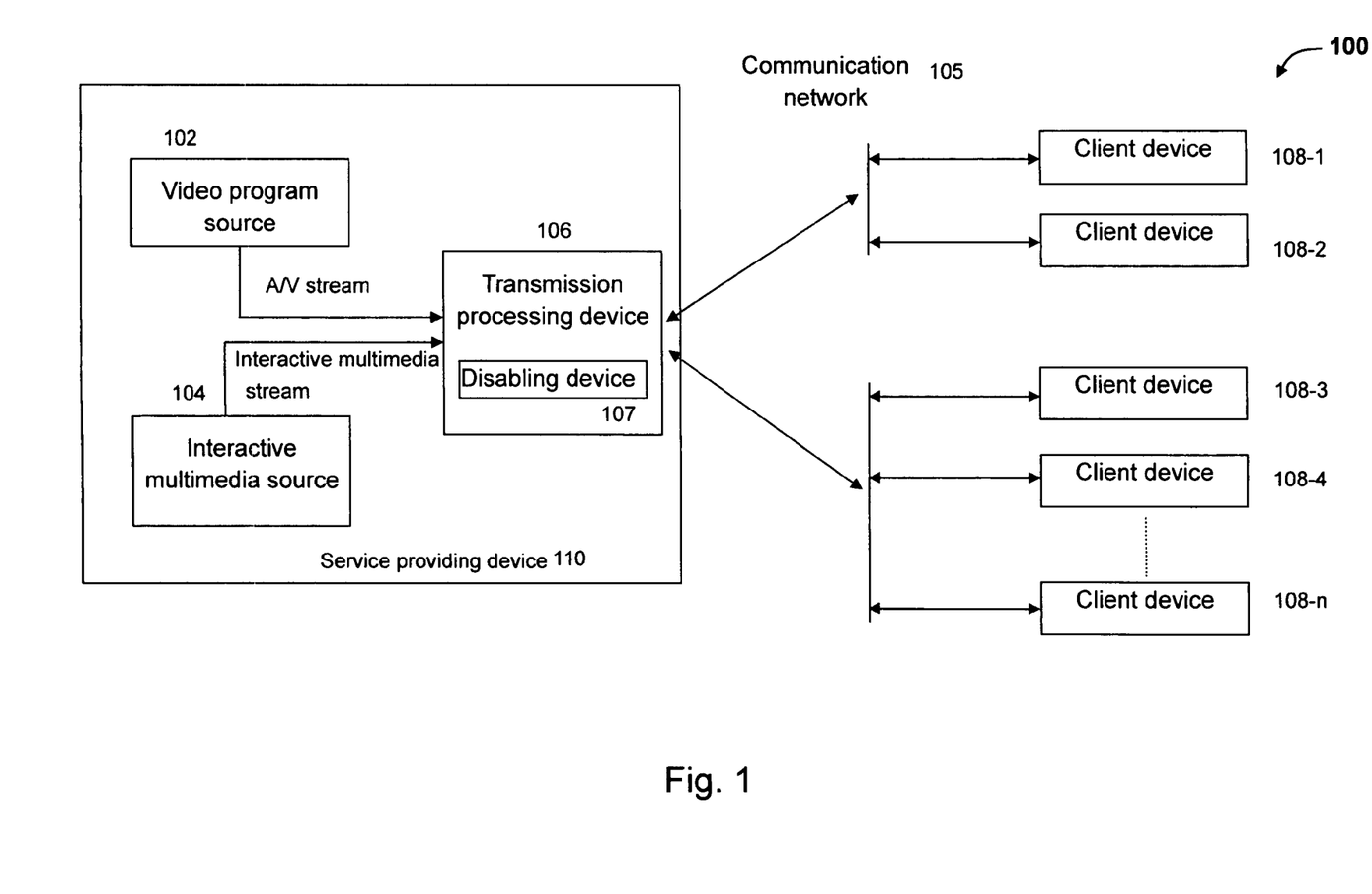
FIG. 1 is a schematic block diagram showing a digital communication system used to explain an embodiment of the invention.

FIG. 1 is a schematic block diagram showing a digital communication system 100 in which the method of the present embodiment of the invention is implemented. As shown in FIG. 1, a plurality of client devices 108-1 to 108-n, such as personal digital assistants (PDA), mobile terminals or television receivers, are in communication with a service providing device 110 including service sources through a communication network 105. In a variant of the embodiment, the service sources are physically separate from the service providing device 110, and connected with it through the communication system 100. The service source may include several service providers, such as video program source 102 and other interactive multimedia content source 104 as shown in FIG. 1, so that the service providing device 110 can provide program content, interactive multimedia information and description of their service to the client devices 108 in a channel after the processing of the transmission processing device 106. According to the embodiment, the transmission processing device 106 includes a disabling device 107 for disabling the client devices 108-1 to 108-n from sending interactive multimedia requests to the service providing device 110 according to a predetermined condition.

The client devices 108 can be assigned to several multi-cast groups, and receive digital information multi-cast or broadcast from the service providing device 110. For example, clients 108-1 and 108-2 are assigned to a multicast group, and clients 108-3 to 108-n are assigned to another multicast group.

During a specific period when a video scene of a program is being broadcasted, an corresponding interactive multimedia information list including multiple options of interactive multimedia contents, is transmitted to the client devices 108 along with the currently broadcast program in the channel, and then the specific interactive multimedia information is delivered to the corresponding client devices based on specific requests from the users. The interactive multimedia information list can be a text table, graphics menu or the like, and can change e.g. when the scene of the video program changes.

Figure 2:
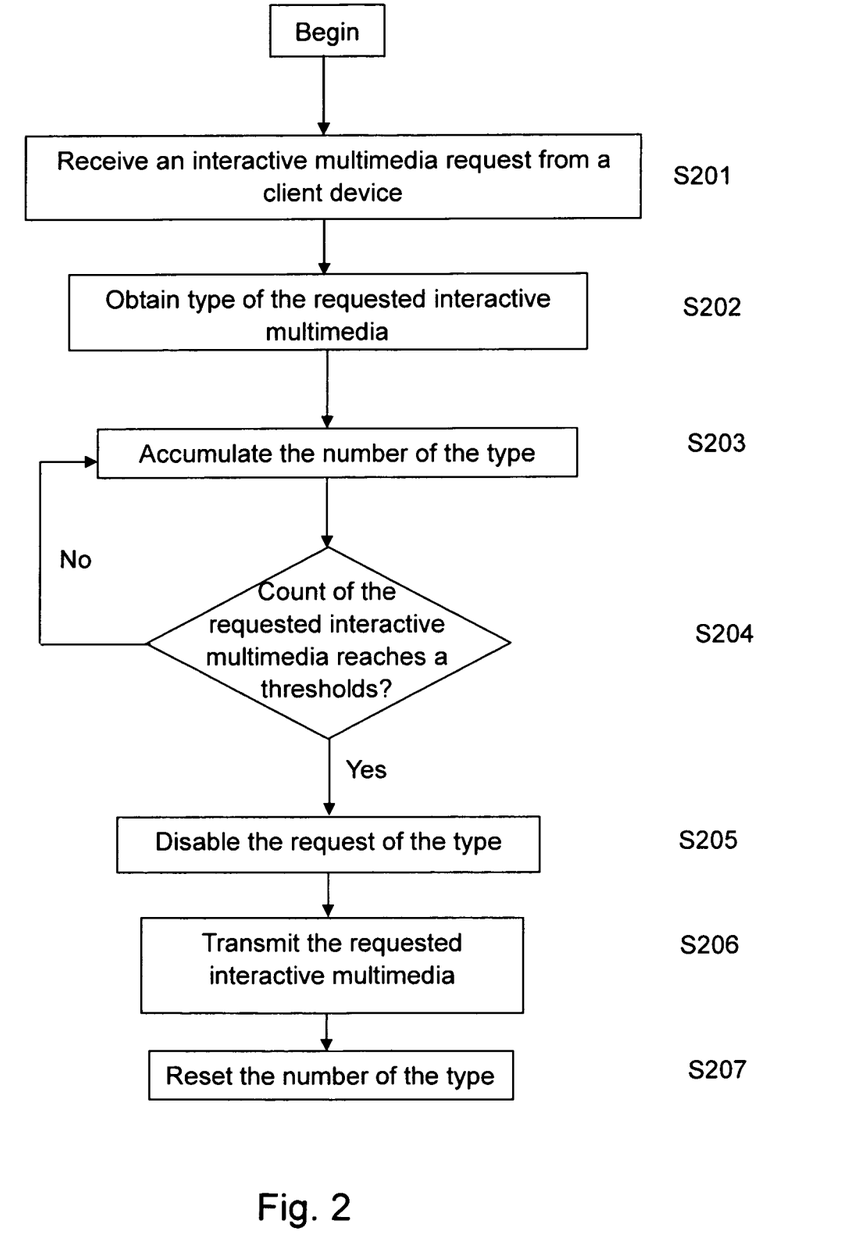
FIG. 2 is a flow chart showing a method for delivering interactive multimedia contents according to the embodiment of the invention.

FIG. 2 is a flow chart showing a method for delivering interactive multimedia content according to the embodiment of the invention. Suppose that some users are enjoying a football match broadcast with interactive multimedia service, and a player has just scored a goal. At this specific time period, an option list of the corresponding interactive multimedia contents including the following options: background of the athlete, history of the team, and score of this team at this match and so on, are shown on a display of the client devices.

Figure 3:
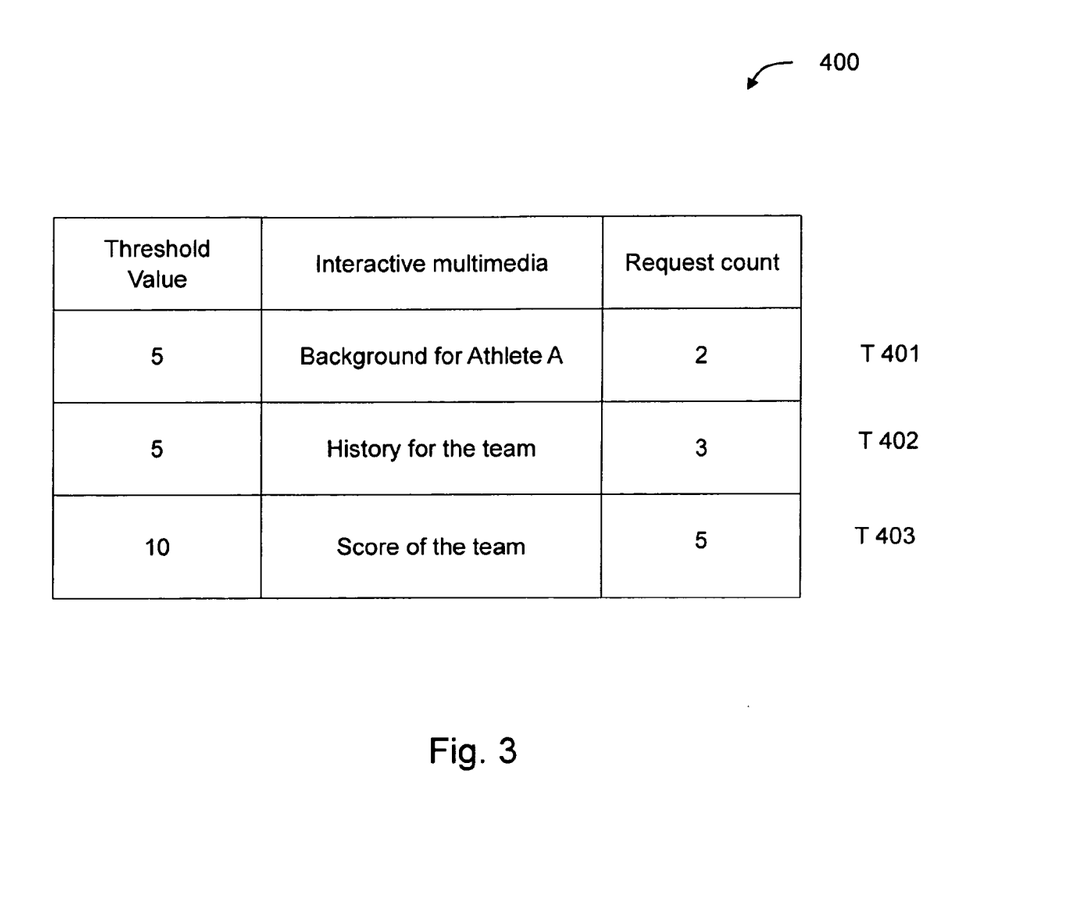
FIG. 3 is an illustrative table showing an interactive multimedia list according to the embodiment of the invention.

If one user using client device 108-1 wants to see the background information of the football player in the list, he/she sends a request for a given interactive multimedia content, that is, a request for the background information of the football player to the service providing device 110 by an input device such as a remote control device, and the service providing device 110 receives the request from the client device at step S201. According to the embodiment, the service providing device 110 maintains a table showing the requested interactive multimedia as shown in FIG. 3. This table includes three columns: interactive multimedia type, request count and threshold value. The column of interactive multimedia type means interactive multimedia options relating to the current program, such as background of athlete A T401, history for the current team T402, score of the team T403 and so on. The request count means respective request number received from users. The threshold value is the predetermined condition for disabling the request sending, such as request number for respective interactive multimedia, and if the request count reaches the threshold value, the service providing device 110 will inform all client devices 108 to disable sending a request for this interactive multimedia content, and in response to the predetermined condition, start to delivery, such as broadcast or multicast, the requested interactive multimedia content to the client devices 108.

Returning now to FIG. 2, after receiving a request for a given interactive multimedia from a client device, the service providing device 110 can obtain the type of the requested interactive multimedia at step S202, and at step S203 accumulate the number of times this type of interactive multimedia has been requested in the table as shown in FIG. 3. Here, if the requested type is a new type in the table, this new type will be added to the table and the related request count is set to 1. If the request type already exists in the table, it will be incremented by 1. According to the embodiment, the tables for each request type are not maintained in a memory of server, but are recorded in a database. The table can be refreshed regularly as a function of the predetermined condition and the received request.

Then at step S204, the service providing device 110 determines whether a request count has reached the pre-determined threshold. If no, it will continue the accumulation at step S203. If yes for a specific type of interactive multimedia request, the service providing device 110 will broadcast or multicast a disable command message to all client devices 108 to disable the corresponding request at step S205. The disable command message indicates that the service providing device 110 has received the required number of these requests and is preparing to process the requests. For example, if other users also want to see the same interactive multimedia, these users still use the input device of their client devices 108 to make such a request, but these requests will not be sent to the service providing devices 110 through the uplink channel of the communication network 105. The specific process of the client device will be described in detail later.

After disabling a type of interactive multimedia request, the service providing device 110 will deliver the corresponding requested interactive multimedia contents to the client devices 108 in response to the predetermined condition at step S206. Thus, all client devices 108 can receive the delivered interactive multimedia contents (even those having not sent their request before a disablement message), and those having sent the type of interactive multimedia request by an input device can display the requested interactive multimedia to the users. Then the request count in the table will be reset at step S207 if the football match is still playing, and this type of interactive multimedia can be requested again. At the same time, the service providing device 110 sends a command to all clients to enable relative request operations when the interactive multimedia information list and the corresponding scene of current program is still alive, and if the scene has changed, a updated list will be displayed to the users.

In another embodiment, the service providing device 110 may broadcast a disable command message to all client devices 108 to disable the corresponding request according to a predetermined condition of a time period from receiving the first request of the respective multimedia type. Thus, the users that have requested the interactive multimedia contents can obtain the requested interactive multimedia contents after the time period, despite the insufficient number of requests. In addition, request count and time period threshold value can be combined to realize different embodiments, and the predetermined condition can be selected by one skilled in the art.

Figure 4:
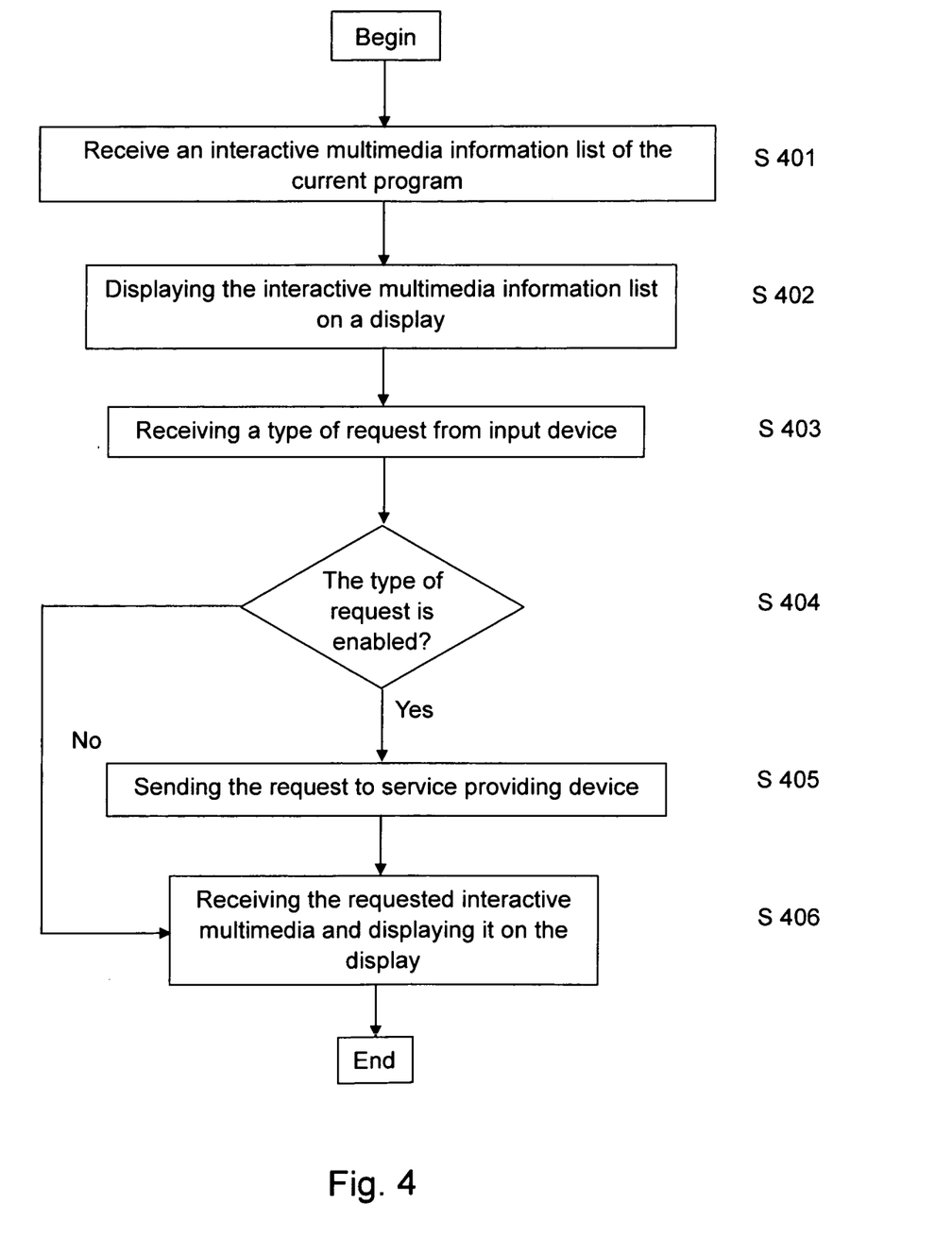
FIG. 4 is a flow chart showing a method for receiving interactive multimedia contents according to the embodiment of the invention.

FIG. 4 is a flow chart showing a method for receiving interactive multimedia contents according to the above mentioned embodiment. When a user is watching a football match program broadcasted from a service providing device 110 by a client device 108-1, a interactive multimedia information list of the current program, such as the above mentioned options including background of the athlete, history of the team and so on, is received at step S401, and is displayed on a display device of the client device 108-1 at step S402. If the user wants to obtain content in the list, he/she can input a request command for the specific interactive multimedia content to be sent to the service providing device 110 by an input device of the client device 108-1, that is, the client device 108-1 receives an interactive multimedia request from input device at step S403. Here, the input device can be a part of the client device or can be a separate device.

At the same time, some users of other client devices 108-2 to 108-n may also want to see this specific interactive multimedia content, and send a request to the service providing device 110. According to the above explanation of FIG. 2, if the request count of this type of interactive multimedia reached the predetermined threshold value, the service providing device 110 will broadcast a disable command message to the client devices 108.

After receiving a type of interactive multimedia request from the input device, the client device 108-1 will determine whether this type of interactive multimedia is enabled or not at step S404, if the answer is yes, the client device 108-1 can send the request to the service providing device 110 at step S405 via a uplink channel of the communication network 105, and if the answer is no, the client device 108-1 will not send the request. Then the client device 108-1 will receive the requested interactive multimedia broadcasted by the service providing device 110 and display it to the user at step S406.

On the other hand, if a user doesn't input a given type of interactive multimedia content, but receives that type of interactive multimedia content broadcasted from the service providing device 110 by the client device 108, then it will not display this interactive multimedia content to this user.

In another embodiment, the client device 108 may disable the sending of interactive multimedia requests to the service providing device 110 voluntarily according to a predetermined condition, and the predetermined condition includes a time period from receiving interactive multimedia information list of the broadcasting program. For example, if the time period is reached, even if the user initiates sending a request using the input device, the client device 108 will not forward the request to the service providing device 110. In addition, the predetermined condition is that whether a disabling command is received from the service providing device 110. When the requested multimedia content is received by the client device 108, it will be displayed to the user.

Figure 5:
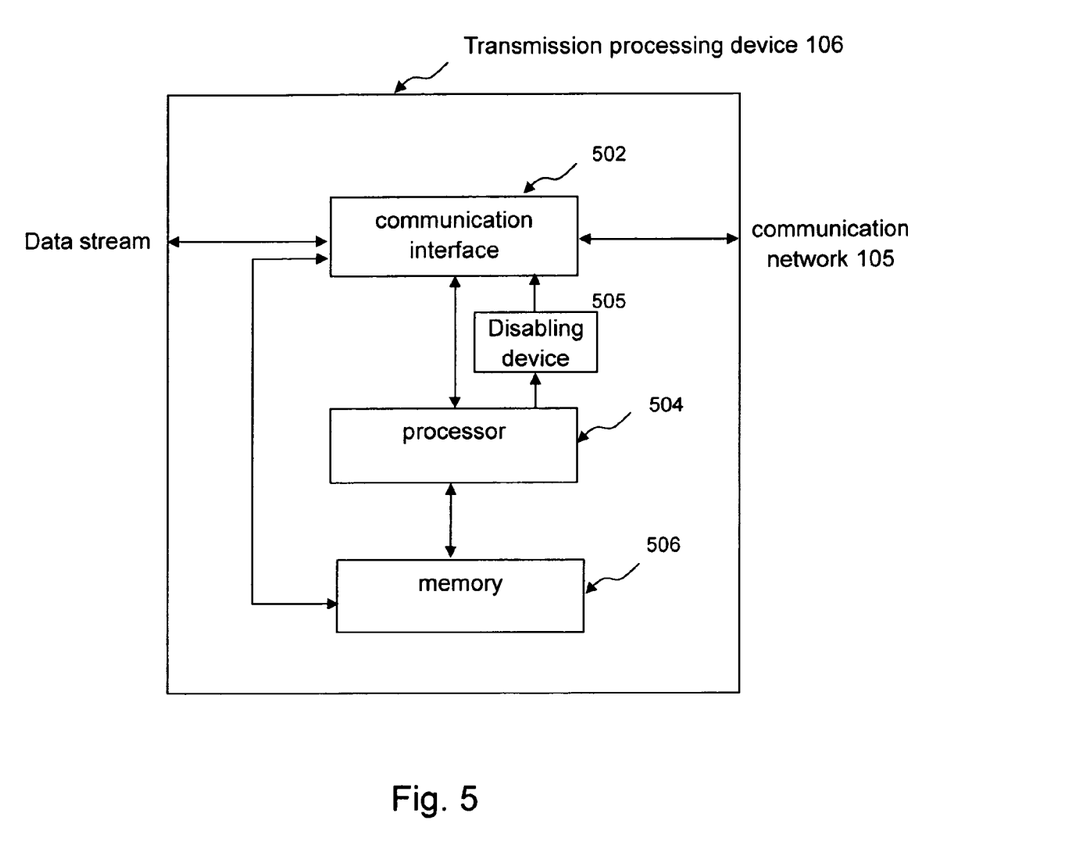
FIG. 5 is a block diagram showing a transmission processing device according to the embodiment of the invention.

FIG. 5 is a block diagram showing the transmission processing device 106 of the service providing device 110 according to the embodiment of the invention. The transmission processing device 106 is adapted to process the digital information from video program source 102 and other interactive multimedia content source 104, and handle communication with the client devices 108 through communication network 105 such as a digital broadcast network. The digital information process may comprise encapsulation, modulation and transmission. The interactive multimedia content can be either integrally multiplexed with a conventional A/V stream or separately transmitted. While on the client device 108, an interactive multimedia engine previously installed on it is responsible for rendering the media transparently over A/V stream.

The transmission processing device 106 comprises a communication interface 502 for receiving data from the service source, and exchanging data with a plurality of client devices 108 through the communication network 105, a processor 504 coupled with the communication interface 502 for processing data and for controlling the communication interface 502, so as to exchange data and provide service to the client devices 108 based on the above embodiments, and a disabling device 505 for providing a disable command message to the client device 108 through the communication interface 502, according to the multimedia request table processed by the processor 504. According to another embodiment, the disabling device 505 can be a part of the processor 504.

The transmission processing device 106 also includes a memory 506 for storing the buffered video program, the other interactive multimedia contents, and executable instructions and data for programming the processor 504 according to the present embodiment. Preferably, the communication interface 502, the processor 504, the disabling device 505 and the memory 506 can be combined in whole or in part and fabricated as an integrated circuit.

As mentioned above, transmission processing device 106 of the service providing device 110 broadcasts or multicasts video program along with a corresponding interactive multimedia list to client devices 108 via the communication interface 502. Then, the transmission processing device 106 receives interactive multimedia requests, accumulates the request counts according to the procedure flow shown in FIG. 2, and then broadcasts or multicasts a disable command from the disabling device 505 and interactive multimedia contents stored in the memory 506.

Figure 6:
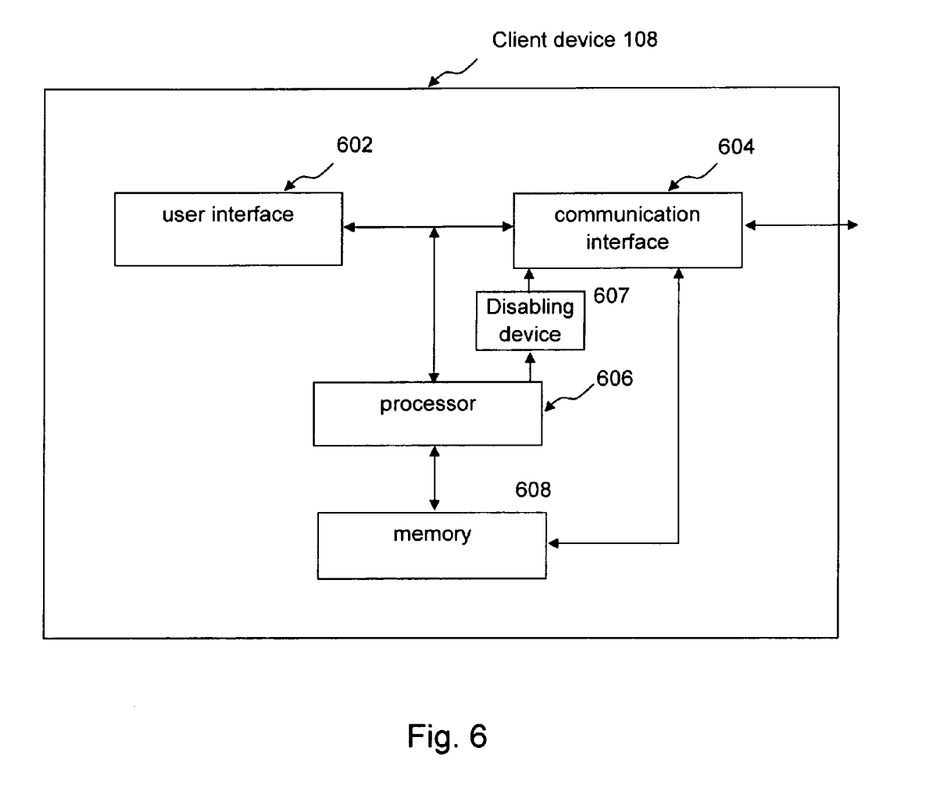
FIG. 6 is a block diagram showing a client device according to the embodiment of the invention.

FIG. 6 is a block diagram showing the client device 108 according to the embodiment. The client device 108 comprises a processor 606 for controlling a communication interface 604 coupled to the processor 606 to communicate with the transmission processing device 106, a user interface 602 comprising well-known elements, such as a keypad, a display, and audio transducers etc. and a disabling device 607 for disabling sending a multimedia request to the service providing device 110 through the communication interface 604, according to a disabling instruction from the processor 606. The disabling instruction is obtained from a predetermined condition including a disabling command received from the service providing device 110, and a predetermined time interval from receiving the interactive multimedia content list. According to another embodiment, the disabling device 607 can be a part of the processor 606.

In addition, the client device 108 includes a memory 608 coupled to the processor 606, and storing video program, interactive multimedia contents, and executable instructions and data for programming the processor 606 in accordance with the embodiment. Preferably, the processor 606, the communication interface 604, the disabling device 607 and the memory 608 can be combined in whole or in part and fabricated as an integrated circuit.

As mentioned above, processor 606 of client device 108 controls the communication interface 604 so as to communicate with the transmission processing device 106 and receive program and other interactive multimedia information according to the input of users by user interface 602.

The foregoing merely illustrates the embodiment of the invention and it will thus be appreciated that those skilled in the art will be able to devise numerous alternative arrangements which, although not explicitly described herein, embody the principles of the invention and are within its spirit and scope.

The invention claimed is:

1. A method used in a service providing device for delivering interactive second multimedia content associated with a first piece of multimedia content to a plurality of client devices that are receiving the first piece of multimedia content, comprising:
    receiving a request for a second multimedia content associated with the first piece of multimedia content, from at least one of the plurality of client devices;
    in response to a predetermined condition, disabling all of the plurality of client devices from sending further requests for said second multimedia content to the service providing device; and
    delivering the second multimedia content to the plurality of client devices that are receiving the first piece of multimedia content after said disabling of the client devices from sending further requests for said second multimedia content.

2. The method according to claim 1, wherein the disabling comprises informing the plurality of client devices according to the predetermined condition, to disable sending further requests for said second multimedia content to the service providing device, even if the further requests are made at the plurality of client devices.

3. The method according to claim 1, wherein the predetermined condition comprises receiving requests for a given interactive second multimedia content from a predetermined number of clients.

4. The method according to claim 1, wherein the predetermined condition comprises reaching the end of a predetermined time interval following receiving the first request for the interactive second multimedia content.

5. The method according to claim 1, wherein the interactive second multimedia content comprises information relating to a video program transmitted from the service providing device to the plurality of client devices.

6. A method for receiving interactive second multimedia content associated with a first piece of multimedia content, used in a client device of a communication network, comprising:
    receiving a request for a second multimedia content associated with the first piece of multimedia content to be sent to a service providing device of the communication network, from an input device of the client device;
    in response to a predetermined condition, disabling sending a request message corresponding to the user request to the service providing device; and
    displaying the second multimedia content received from the service providing device after said disabling of the client device from sending further requests for said second multimedia content.

7. The method according to claim 6, wherein the step of disabling comprises disabling sending the request for said second multimedia content to the service providing device, even if a request is input at the client device.

8. The method according to claim 6, wherein the predetermined condition comprises receiving a disabling command from the service providing device.

9. The method according to claim 6, further comprising receiving an interactive multimedia content list from the service providing device before the step of receiving the request.

10. The method according to claim 6, wherein the predetermined condition comprises reaching the end of a predetermined time interval from receiving the interactive second multimedia content list.

11. The method according to claim 6, wherein the interactive second multimedia content comprises information relating to a video program transmitted from the service providing device to the plurality of client devices.

12. A service providing device for delivering interactive second multimedia content associated with a first piece of multimedia content to a plurality of client devices that are receiving the first piece of multimedia content, comprising:
    a transmission processing device configured to receive a request for a second multimedia content associated with the first piece of multimedia content, from at least one of the plurality of client devices, comprising:
        a disabling device configured to disable all of the plurality of client devices from sending further requests for said second multimedia content to the service providing device in response to a predetermined condition; and
    a communication interface configured to deliver the second multimedia content to the plurality of client devices that are receiving the first piece of multimedia content after said disabling of the client devices from sending further requests for said second multimedia content.

13. The service providing device according to claim 12, wherein the transmission processing device is configured to inform the plurality of client devices to disable sending further requests for said second multimedia content to the service providing device, even if the further requests are made at the plurality of client devices.

14. The service providing device according to claim 12, wherein the predetermined condition comprises receiving requests for a given interactive second multimedia content from a predetermined number of clients.

15. The service providing device according to claim 12, wherein the predetermined condition comprises reaching the end of a predetermined time interval following receiving the first request for the interactive second multimedia content.

16. The service providing device according to claim 12, wherein the interactive second multimedia content comprises information relating to a video program transmitted from the service providing device to the plurality of client devices.

17. A client device of a communication network, comprising:
    a user interface configured to receive a request for a second multimedia content, associated with the first piece of multimedia content to be sent to a service providing device of the communication network, from an input device;

a disabling device, configured to disable sending a request message corresponding to the user request to the service providing device in response to a predetermined condition, wherein the user interface is further configured to display the second multimedia content received from the service providing device after said disabling from sending further requests for said second multimedia content.

18. The client device according to claim 17, wherein the disabling device is configured to disable sending the request for said second multimedia content to the service providing device, even if a request is input at the client device.

19. The client device according to claim 17, wherein the predetermined condition comprises receiving a disabling command from the service providing device.

20. The client device according to claim 17, further comprising a communication interface configured to receive an interactive multimedia content list from the service providing device before the user interface receives the request.

21. The client device according to claim 17, wherein the predetermined condition comprises reaching the end of a predetermined time interval from receiving the interactive second multimedia content list.

22. The client device according to claim 17, wherein the interactive second multimedia content comprises information relating to a video program transmitted from the service providing device to the plurality of client devices.

23. A method used in a service providing device for delivering interactive second multimedia content associated with a first piece of multimedia content to a plurality of client devices that are receiving the first piece of multimedia content, comprising:

receiving a request for a second multimedia content associated with the first piece of multimedia content, from at least one of the plurality of client devices;

in response to a predetermined condition, disabling all of the plurality of client devices from sending further requests for said second multimedia content to the service providing device, said predetermined condition comprising receiving requests for a given interactive second multimedia content from a predetermined number of clients; and delivering the second multimedia content to the plurality of client devices that are receiving the first piece of multimedia content after said disabling of the client devices from sending further requests for said second multimedia content.

24. A method used in a service providing device for delivering interactive second multimedia content associated with a first piece of multimedia content to a plurality of client devices that are receiving the first piece of multimedia content, comprising:

receiving a request for a second multimedia content associated with the first piece of multimedia content, from at least one of the plurality of client devices;

in response to a predetermined condition, disabling all of the plurality of client devices from sending further requests for said second multimedia content to the service providing device, said predetermined condition comprising reaching the end of a predetermined time interval following receiving the first request for the interactive second multimedia content; and delivering the second multimedia content to the plurality of client devices that are receiving the first piece of multimedia content after said disabling of the client devices from sending further requests for said second multimedia content.

25. A service providing device for delivering interactive second multimedia content associated with a first piece of multimedia content to a plurality of client devices that are receiving the first piece of multimedia content, comprising:

a transmission processing device configured to receive a request for a second multimedia content associated with the first piece of multimedia content, from at least one of the plurality of client devices, comprising:

a disabling device configured to disable all of the plurality of client devices from sending further requests for said second multimedia content to the service providing device in response to a predetermined condition, said predetermined condition comprising receiving requests for a given interactive second multimedia content from a predetermined number of clients; and a communication interface configured to deliver the second multimedia content to the plurality of client devices that are receiving the first piece of multimedia content after said disabling of the client devices from sending further requests for said second multimedia content.

26. A service providing device for delivering interactive second multimedia content associated with a first piece of multimedia content to a plurality of client devices that are receiving the first piece of multimedia content, comprising:

a transmission processing device configured to receive a request for a second multimedia content associated with the first piece of multimedia content, from at least one of the plurality of client devices, comprising:

a disabling device configured to disable all of the plurality of client devices from sending further requests for said second multimedia content to the service providing device in response to a predetermined condition, said predetermined condition comprising reaching the end of a predetermined time interval following receiving the first request for the interactive second multimedia content; and a communication interface configured to deliver the second multimedia content to the plurality of client devices that are receiving the first piece of multimedia content after said disabling of the client devices from sending further requests for said second multimedia content.

27. A client device of a communication network, comprising:

a user interface configured to receive a request for a second multimedia content, associated with the first piece of multimedia content to be sent to a service providing device of the communication network, from an input device;

a disabling device configured to disable sending a request message corresponding to the user request to the service providing device in response to a predetermined condition, said disabling device being further configured to disable sending the request for said second multimedia content to the service providing device, even if a request is input at the client device, wherein the user interface is further configured to display the second multimedia content received from the service providing device after said disabling from sending further requests for said second multimedia content.

28. A client device of a communication network, comprising:

a user interface configured to receive a request for a second multimedia content, associated with the first piece of multimedia content to be sent to a service providing device of the communication network, from an input device;

a disabling device configured to disable sending a request message corresponding to the user request to the service providing device in response to a predetermined condition, the predetermined condition comprising receiving a disabling command from the service providing device;

wherein the user interface is further configured to display the second multimedia content received from the service providing device after said disabling from sending further requests for said second multimedia content.

29. A client device of a communication network, comprising:

a user interface configured to receive a request for a second multimedia content, associated with the first piece of multimedia content to be sent to a service providing device of the communication network, from an input device;

a disabling device configured to disable sending a request message corresponding to the user request to the service providing device in response to a predetermined condition, the predetermined condition comprising reaching the end of a predetermined time interval from receiving the interactive second multimedia content list;

wherein the user interface is further configured to display the second multimedia content received from the service providing device after said disabling from sending further requests for said second multimedia content.

* * * * *